(12) United States Patent
Inoue et al.

(10) Patent No.: US 9,718,464 B2
(45) Date of Patent: Aug. 1, 2017

(54) VEHICLE CONFIGURED TO SECURE OIL DURING MOTOR FAILURE

(71) Applicant: TOYOTA JIDOSHA KABUSHIKI KAISHA, Toyota-shi, Aichi-ken (JP)

(72) Inventors: Yuji Inoue, Nissin (JP); Yukihiko Ideshio, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/910,510

(22) PCT Filed: Jul. 31, 2014

(86) PCT No.: PCT/IB2014/001430
§ 371 (c)(1),
(2) Date: Feb. 5, 2016

(87) PCT Pub. No.: WO2015/019148
PCT Pub. Date: Feb. 12, 2015

(65) Prior Publication Data
US 2016/0185343 A1   Jun. 30, 2016

(30) Foreign Application Priority Data

Aug. 8, 2013   (JP) .................................. 2013-165583

(51) Int. Cl.
*B60W 20/50* (2016.01)
*B60K 6/387* (2007.10)
(Continued)

(52) U.S. Cl.
CPC ............. *B60W 20/50* (2013.01); *B60K 6/387* (2013.01); *B60K 6/50* (2013.01); *B60K 6/547* (2013.01); *B60W 10/02* (2013.01); *B60W 10/023* (2013.01); *B60W 10/06* (2013.01); *B60W 10/08* (2013.01); *B60W 10/10* (2013.01); *B60W 10/115* (2013.01); *B60W 10/30* (2013.01); *F16H 61/0031* (2013.01); *B60K 2006/4825* (2013.01); *B60W 2050/0292* (2013.01);
(Continued)

(58) Field of Classification Search
None
See application file for complete search history.

(56) References Cited

U.S. PATENT DOCUMENTS

2009/0111637 A1* 4/2009 Day ..................... B60K 6/445
475/159
2009/0112421 A1* 4/2009 Sah ..................... F16H 61/0031
701/59
(Continued)

FOREIGN PATENT DOCUMENTS

| | | |
|---|---|---|
| CN | 102556049 A | 7/2012 |
| JP | 2000-186758 A | 7/2000 |

(Continued)

*Primary Examiner* — Krishnan Ramesh
(74) *Attorney, Agent, or Firm* — Oliff PLC (57) ABSTRACT

Even when a motor fails in an EV travel mode in which a clutch is disengaged, an amount of hydraulic oil that is supplied to the clutch can be secured by reducing a transmission leaked amount. Accordingly, the clutch can be engaged, and an oil pump can be driven by power of an engine. Thus, an evacuation travel by the engine is allowed when the motor fails in the EV travel mode.

4 Claims, 8 Drawing Sheets

(51) Int. Cl.

| | |
|---|---|
| *B60K 6/547* | (2007.10) |
| *B60W 10/02* | (2006.01) |
| *B60W 10/08* | (2006.01) |
| *B60W 10/115* | (2012.01) |
| *F16H 61/00* | (2006.01) |
| *B60W 10/06* | (2006.01) |
| *B60W 10/30* | (2006.01) |
| *B60K 6/50* | (2007.10) |
| *B60W 10/10* | (2012.01) |
| B60W 50/029 | (2012.01) |
| F16H 61/12 | (2010.01) |
| B60K 6/48 | (2007.10) |

(52) U.S. Cl.
CPC . *B60W 2050/0295* (2013.01); *B60W 2400/00* (2013.01); *B60W 2710/02* (2013.01); *B60W 2710/022* (2013.01); *B60W 2710/10* (2013.01); *B60W 2710/1083* (2013.01); *B60Y 2200/92* (2013.01); *B60Y 2300/70* (2013.01); *B60Y 2306/00* (2013.01); *F16H 2061/0037* (2013.01); *F16H 2061/1224* (2013.01); *F16H 2061/1232* (2013.01); *F16H 2061/1296* (2013.01); *Y02T 10/6252* (2013.01); *Y02T 10/6286* (2013.01); *Y10S 903/915* (2013.01); *Y10S 903/945* (2013.01)

(56) References Cited

U.S. PATENT DOCUMENTS

| | | | |
|---|---|---|---|
| 2012/0103709 A1 | 5/2012 | Mochiyama et al. | |
| 2013/0343927 A1* | 12/2013 | Ramdane | F04D 29/051 |
| | | | 417/365 |
| 2014/0199179 A1* | 7/2014 | Da Silva | F04D 29/058 |
| | | | 417/44.1 |
| 2015/0283993 A1* | 10/2015 | Takano | B60K 6/36 |
| | | | 701/22 |
| 2016/0009273 A1* | 1/2016 | Nagamine | F16H 61/0031 |
| | | | 180/65.25 |
| 2016/0176392 A1* | 6/2016 | Murata | B60K 6/445 |
| | | | 701/22 |

FOREIGN PATENT DOCUMENTS

| | | |
|---|---|---|
| JP | 2012-097813 A | 5/2012 |
| JP | 2012-179955 A | 9/2012 |
| JP | 2013-082404 A | 5/2013 |
| JP | 2013-119881 A | 6/2013 |

\* cited by examiner

VEHICLE CONFIGURED TO SECURE OIL DURING MOTOR FAILURE

BACKGROUND OF THE INVENTION

1. Field of the Invention

The present invention relates to a vehicle that includes an engine, a motor, a transmission, a clutch for connecting/disconnecting the engine to/from the motor, and a mechanical oil pump that is driven in conjunction with rotation of a rotary member located between the clutch and drive wheel.

2. Description of Related Art

A vehicle has been well-known that includes: an engine; a motor provided in a power transmission path between the engine and drive wheel; a transmission for constituting a part of the power transmission path; a clutch for connecting/disconnecting the engine to/from the motor; and a mechanical oil pump that is connected to a rotary member located between the clutch and the drive wheel and is driven in conjunction with rotation of the rotary member, thereby supplying hydraulic oil to the clutch and the transmission. An example of such includes a vehicle disclosed in Japanese Patent Application Publication No. 2012-179955 (JP 2012-179955 A). In the vehicle disclosed in JP 2012-179955 A, the mechanical oil pump is connected to a pump impeller of a torque converter that integrally rotates with a rotor of the motor. This oil pump is rotationally driven by the engine and/or the motor to generate a hydraulic oil pressure that is used for execution of gear change control of an automatic transmission, disengagement control of the clutch, and the like.

SUMMARY OF THE INVENTION

If the motor fails in a motor travel mode in which the clutch is disengaged and the vehicle travels only by the motor as a drive power source, a discharge amount of the oil pump that is rotationally driven by the motor is reduced. This prevents the clutch from being engaged since the actual discharge amount of the oil pump is insufficient as the discharge amount that is required to engage the clutch. It should be noted that such a problem remains unknown. Thus, a method for appropriately controlling the clutch even in a situation where failure of the motor during the disengagement of the clutch leads to a reduction in the discharge amount of the oil pump has not been suggested.

The present invention provides a vehicle that can secure an amount of the hydraulic oil supplied to the clutch even when the motor fails during the disengagement of the clutch.

An aspect of the present invention relates to a vehicle. The vehicle includes an engine, a transmission, a drive wheel, a first motor, a clutch, a mechanical oil pump, and an electronic control unit. The first motor is provided in a power transmission path between the engine and the drive wheel. The power transmission path includes the transmission. The clutch is configured to disconnect the engine from the first motor by disengaging. The mechanical oil pump is connected to a rotary member disposed on the power transmission path between the clutch and the drive wheel, the mechanical oil pump configured to be driven by rotation of the rotary member to supply hydraulic oil to the clutch and the transmission. The electronic control unit is configured to control an operation related to the transmission, so as to reduce an amount of the hydraulic oil that is leaked due to the operation related to the transmission when the first motor fails in a motor travel mode in which the clutch is disengaged and only the first motor is used as a drive power source.

If the motor fails in the motor travel mode in which the clutch is disengaged, a discharge amount of the mechanical oil pump is reduced. Thus, when the motor fails in the motor travel mode in which the clutch is disengaged, the amount of the hydraulic oil that is leaked due to the operation related to the transmission is reduced. Accordingly, it is possible with such a configuration to secure the amount of the hydraulic oil that is supplied to the clutch. Thus, the clutch can be engaged, and the mechanical oil pump can be driven by power of the engine. Therefore, an evacuation travel by the engine is allowed when the motor fails in the motor travel mode.

The vehicle may include a hydraulic control circuit. The hydraulic control circuit may be configured to control the operation of which related to the transmission via a solenoid valve. The electronic control unit may be configured to control the solenoid valve so as to minimize the amount of the hydraulic oil that is leaked due to the operation related to the transmission. With such a configuration, even when the motor fails in the motor travel mode in which the clutch is disengaged, the amount of the hydraulic oil that is leaked due to the operation related to the transmission is minimized. Thus, it is possible to further reliably secure the amount of the hydraulic oil that is supplied to the clutch.

In the vehicle, the electronic control unit may be configured to control the operation related to the transmission so as to reduce the amount of the hydraulic oil that is leaked due to the operation related to the transmission and so as to increase an amount of the hydraulic oil supplied to the clutch. With such a configuration, even when the motor fails in the motor travel mode in which the clutch is disengaged, not only the amount of the hydraulic oil that is leaked due to the operation related to the transmission is simply reduced, but also the amount of the hydraulic oil that is supplied to the clutch is appropriately secured.

The vehicle may include a second motor for an oil pump and an electric oil pump. The electric oil pump may be driven by rotation of the second motor to supply the hydraulic oil to the clutch and the transmission. The rotation of the second motor may be independent of the rotation of the rotary member disposed on the power transmission path between the clutch and the drive wheel. Here, in a case where the motor fails during stop of the vehicle or in the motor travel mode, in which the vehicle travels at a low speed, in a state that the clutch is disengaged, even if the amount of the hydraulic oil that is leaked due to the operation related to the transmission is reduced, the amount of the hydraulic oil that is supplied to the clutch cannot be secured or may not possibly be secured. It is because the discharge amount of the mechanical oil pump is originally zero or small. On the contrary, with the configuration described above, the electric oil pump is driven when the motor fails during the disengagement of the clutch. Thus, the amount of the hydraulic oil that is supplied to the clutch can be secured. Therefore, the clutch can be engaged, and the mechanical oil pump can be driven by the power of the engine.

In the vehicle, the electronic control unit may be configured to, when the first motor fails, control the operation related to the transmission so as to reduce the amount of the hydraulic oil that is leaked due to the operation related to the transmission and may be configured to increase the amount of the hydraulic oil supplied to the clutch by the electric oil pump when the first motor fails. With such a configuration, even when the motor fails during the disengagement of the clutch, the amount of the hydraulic oil that is supplied to the clutch is appropriately secured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the present invention, the transmission can preferably be any of various known automatic transmissions (such as a planetary-gear-type automatic transmission, an automatic transmission with two synchronously meshing parallel axes, a DCT, and a CVT). This automatic transmission is configured by a single automatic transmission body, an automatic transmission having a fluid-type transmission device, an automatic transmission having an auxiliary transmission, or the like. Meanwhile, the clutch is an engagement device that can separate the engine from the drive wheel, and is also a wet type or dry type engagement device that is operated by a hydraulic actuator. A hydraulic pressure source of hydraulic oil that is supplied to the hydraulic actuator of the clutch is same as a hydraulic pressure source of the hydraulic oil that is supplied to the transmission. Furthermore, the engine is an internal combustion engine such as a gasoline engine that generates power by fuel combustion, for example.

A detailed description will hereinafter be made on a first example of the present invention with reference to the drawings.

Figure 1:
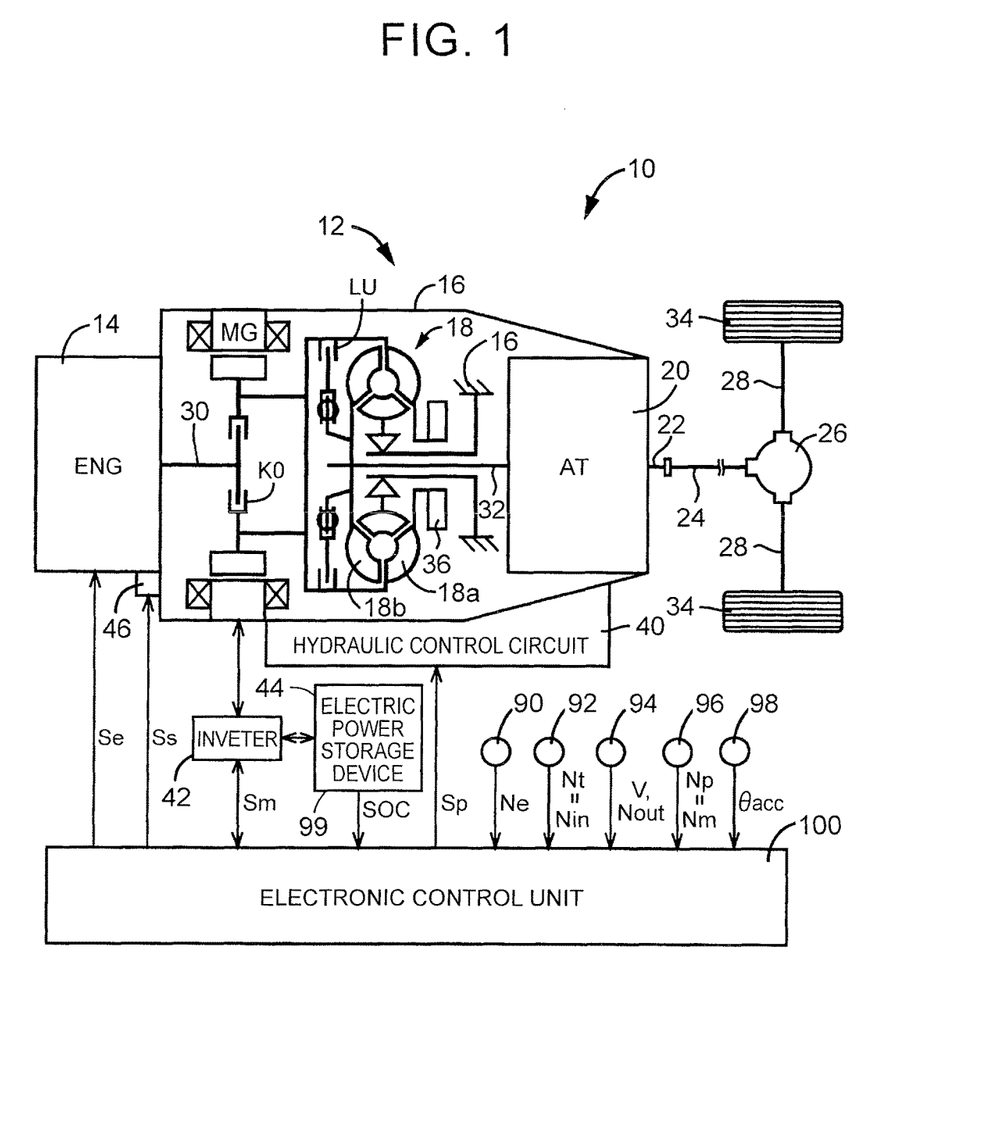
FIG. 1 is a view for illustrating a schematic configuration of a power transmission device that is included in a vehicle to which the present invention is applied, and is also a view for illustrating main components of a control system in the vehicle.

FIG. 1 is a view for illustrating a schematic configuration of a power transmission device 12 that is included in a vehicle 10 to which the present invention is applied, and is also a view for illustrating main components of a control system for various controls in the vehicle 10. In FIG. 1, the vehicle 10 is a hybrid vehicle that includes an engine 14 and a motor MG, both of which function as drive power sources for traveling. The power transmission device 12 includes, from the engine 14 side, a clutch K0 for connecting/disconnecting the engine (hereinafter referred to as the clutch K0), a torque converter 18, an automatic transmission 20, and the like in this order in a transmission case 16 as a non-rotary member. In addition, the power transmission device 12 includes a propeller shaft 24 that is connected to a transmission output shaft 22 as an output rotary member of the automatic transmission 20, a differential gear 26 that is connected to the propeller shaft 24, a pair of axles 28 that is connected to the differential gear 26, and the like. A pump impeller 18a of the torque converter 18 is connected to an engine connecting shaft 30 via the clutch K0, and is directly connected to the motor MG. A turbine impeller 18b of the torque converter 18 is directly connected to a transmission input shaft 32 as an input rotary member of the automatic transmission 20. The power transmission device 12 that is configured just as described is favorably used in the vehicle 10 of front-engine rear-wheel-drive type, for example. In the power transmission device 12, the power (synonymous with torque or a force unless otherwise specified) of the engine 14 is transmitted from the engine connecting shaft 30, which connects between the engine 14 and the clutch K0, to a pair of drive wheels 34 sequentially via the clutch K0, the torque converter 18, the automatic transmission 20, the propeller shaft 24, the differential gear 26, the pair of axles 28, and the like when the clutch K0 is engaged. Just as described, the power transmission device 12 constitutes a power transmission path from the engine 14 to the drive wheel 34.

The vehicle 10 includes, for example: a mechanical oil pump 36 that is connected to the pump impeller 18a; a hydraulic control circuit 40 for controlling a gear change operation of the automatic transmission 20, a disengagement operation of the clutch K0, a disengagement operation of a known lock-up clutch LU (hereinafter referred to as the clutch LU) that is provided in the torque converter 18, and the like; an inverter 42 for controlling an operation of the motor MG; an electric power storage device 44 for transferring/receiving electric power to/from the motor MG via the inverter 42; and a starter 46 for rotationally driving the engine 14 at the start of the engine.

The automatic transmission 20 is a transmission that is interposed in the power transmission path between the torque converter 18 and the drive wheel 34, constitutes a part of the power transmission path between the engine 14 and the drive wheels 34, and transmits the power from the drive power sources for traveling (the engine 14 and the motor MG) to the drive wheel 34 side. The automatic transmission 20 is, for example, a known planetary-gear-type multistage automatic transmission in which a plurality of gear stages, each of which has a different gear ratio γ (=a transmission input shaft rotating speed Nin/a transmission output shaft rotating speed Nout), are selectively established, a known continuously variable transmission in which the gear ratio γ is continuously changed in a stepless manner, or the like. In the automatic transmission 20, the specified gear ratio γ is established in accordance with an accelerator pedal operation amount θacc, a vehicle speed V, or the like when the hydraulic actuator is controlled by the hydraulic control circuit 40, for example. Here, the torque converter 18 can also be regarded as a part of the transmission. That is, the automatic transmission 20 that includes the torque converter 18 can be regarded as the transmission that constitutes a part of the power transmission path.

The motor MG is a so-called motor generator that has a function as a motor for generating mechanical power from electric energy and also has a function as a generator for generating the electric energy from mechanical energy. In addition to the engine 14, or instead of the engine 14, the motor MG generates power for traveling from the electric power (synonymous with the electric energy unless otherwise specified) that is supplied from the electric power storage device 44 via the inverter 42. The motor MG converts the power of the engine 14 and driven power that is received from the drive wheel 34 side to the electric power by regeneration and stores the electric power in the electric power storage device 44 via the inverter 42. Since the motor MG is provided in the power transmission path between the engine 14 and the drive wheels 34 and is connected to the power transmission path between the clutch K0 and the torque converter 18, the power is mutually transmitted between the motor MG and the pump impeller 18a. Just as described, the motor MG is connected to the transmission input shaft 32 of the automatic transmission 20 in a manner to allow the power transmission without interposing the clutch K0 therebetween.

The clutch K0 is a hydraulic frictional engagement device of wet multi-disc type, for example, and is controlled to be disengaged by the hydraulic control circuit 40 with a hydraulic pressure generated by the oil pump 36 being a source pressure. In the disengagement control, torque capacity of the clutch K0 (hereinafter referred to as K0 torque) is varied by regulating a pressure of a solenoid valve or the like in the hydraulic control circuit 40, for example. When the clutch K0 is engaged, the pump impeller 18a and the engine 14 rotate integrally via the engine connecting shaft 30. On the contrary, when the clutch K0 is disengaged, the power transmission between the engine 14 and the pump impeller 18a is blocked. In other words, the engine 14 is cut off from the drive wheel 34 by the disengagement of the clutch K0. Since the motor MG is connected to the pump impeller 18a, the clutch K0 also functions as a clutch that is provided in the power transmission path between the engine 14 and the motor MG to connect/disconnect the power transmission path, that is, as a clutch that connects/disconnects the engine 14 to/from the motor MG.

Figure 2:
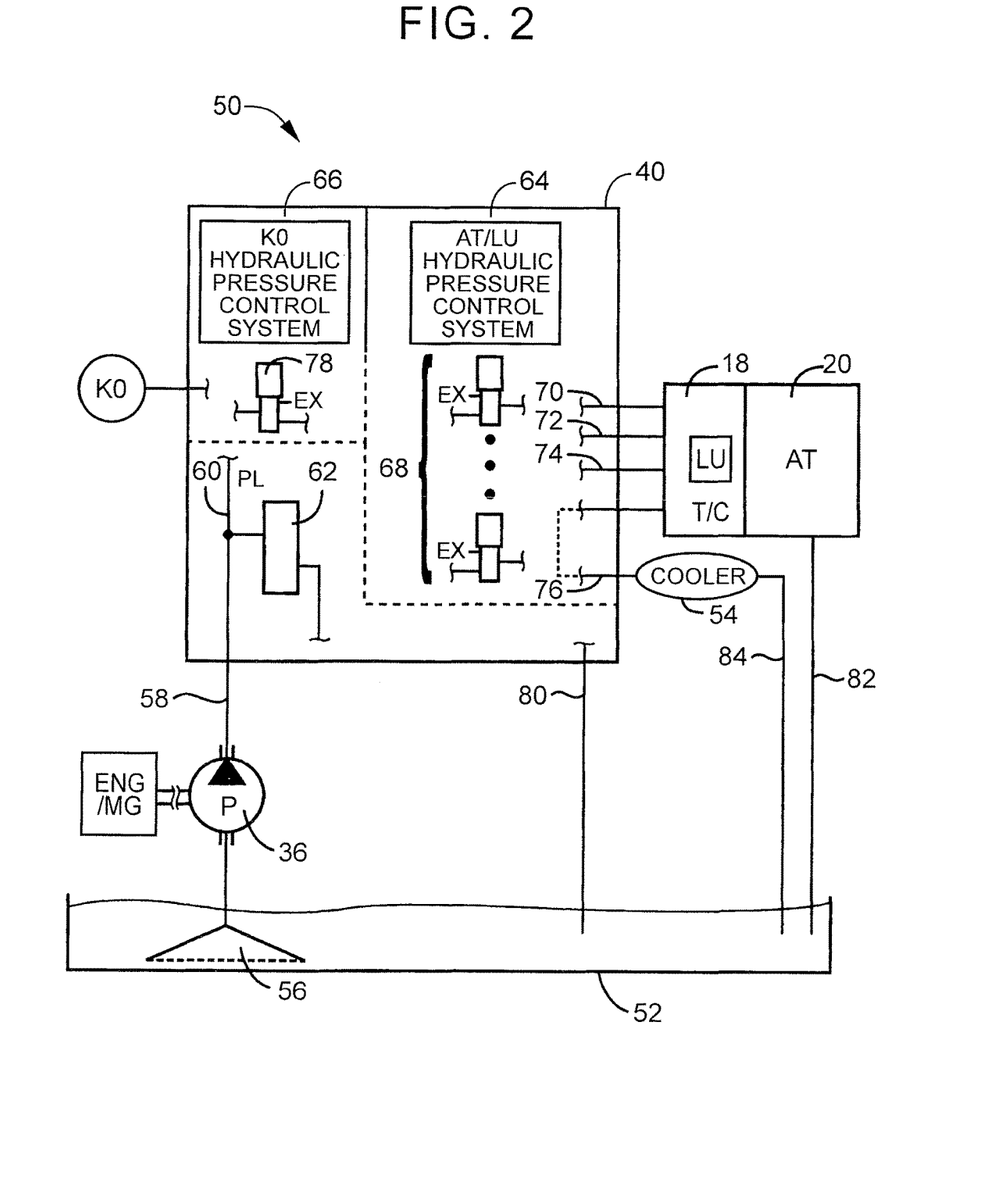
FIG. 2 is a view for illustrating a schematic configuration of a hydraulic system that controls an operation related to a transmission.

FIG. 2 is a view for illustrating a schematic configuration of a hydraulic system 50 that is provided in the vehicle 10 to control operations related to the transmission (the automatic transmission 20 and the torque converter 18 with the clutch LU) and the clutch K0. In FIG. 2, the hydraulic system 50 includes, in addition to the oil pump 36 and the hydraulic control circuit 40 described above, an oil pan 52 that is provided in a lower portion of the transmission case 16, an oil cooler 54 that warms the hydraulic oil in a cold time and cools the hydraulic oil upon completion of warming, and the like. The oil pump 36 is rotationally driven by the engine 14 and/or the motor MG, thereby generating the source pressure of the hydraulic oil that is supplied to the hydraulic control circuit 40 (that is, the hydraulic oil pressure that is used for the execution of gear change control of the automatic transmission 20, the disengagement control of the clutch LU, the disengagement control of the clutch K0, and the like). As described above, the oil pump 36 is driven in conjunction with rotation of the pump impeller 18a that is one of the rotary members between the clutch K0 and the drive wheel 34, thereby supplying the hydraulic oil to the clutch K0 and the transmission (the automatic transmission 20 and the torque converter 18 with the clutch LU), the pump impeller 18a being rotated by the engine 14 and/or the motor MG. The oil pump 36 suctions the hydraulic oil that is refluxed to the oil pan 52 from a suction port (a strainer) 56 and discharges the hydraulic oil to a discharge oil passage 58. The discharge oil passage 58 is connected to an oil passage in the hydraulic control circuit 40 (for example, a line-pressure oil passage 60 through which a line pressure PL flows).

The hydraulic control circuit 40 includes: a primary regulator valve 62 for regulating the line pressure PL with the hydraulic oil pressure output (generated) from the oil pump 36 being the source pressure; an AT/LU hydraulic control system 64 for controlling a gear changing operation of the automatic transmission 20 and a disengaging operation of the clutch LU with the line pressure PL being the source pressure, and a K0 hydraulic control system 66 for controlling the disengaging operation of the clutch K0 with the line pressure PL being the source pressure.

The AT/LU hydraulic control system 64 includes a plurality of solenoid valves 68 for regulating a pressure of the hydraulic oil that is supplied to the hydraulic actuator in the automatic transmission 20, controlling the hydraulic oil that is supplied to the clutch LU, and switching, releasing, and blocking the oil passages through which the hydraulic oil flows. Such oil passages include, for example, an oil passage 70 that is connected to the hydraulic actuator in the automatic transmission 20, an oil passage 72 that is connected to the clutch LU, a lubrication oil passage 74 that is connected to each section in the power transmission path including the automatic transmission 20, a cooling oil passage 76 that is connected to the oil cooler 54, and the like. The AT/LU hydraulic control system 64, which is configured just as described, controls the supply and discharge of the hydraulic oil for operations related to the transmission (the automatic transmission 20 and the torque converter 18 with the clutch LU) via the solenoid valves 68, thereby controlling the operations related to the transmission. The operations related to the transmission (the automatic transmission 20 and the torque converter 18 with the clutch LU) include, for example, maintenance of the gear ratio γ of the automatic transmission 20, the gear changing operation of the automatic transmission 20, lubrication of each section by the hydraulic oil via the lubrication oil passage 74, the warming and cooling of the hydraulic oil via the oil cooler 54, the engaging/disengaging operation of the clutch LU, and the like. The K0 hydraulic control system 66 includes a solenoid valve 78 for regulating a pressure of the hydraulic oil that is supplied to the clutch K0. The K0 hydraulic control system 66, which is configured just as described, controls the supply and discharge of the hydraulic oil for operations related to the clutch K0 via the solenoid valve 78, thereby controlling the operations related to the clutch K0. The operations related to the clutch K0 include, for example, the engaging/disengaging operation of the clutch K0. The hydraulic oil that is discharged in conjunction with the operations of the solenoid valves 68, 78, the hydraulic oil that is supplied to the each section in the power transmission path including the automatic transmission 20 via the lubrication oil passage 74, and the hydraulic oil that is discharged from the oil cooler 54 are refluxed to the oil pan 52 via drain oil passages 80, 82, 84, respectively.

Returning to FIG. 1, the vehicle 10 includes an electronic control unit 100 that includes a control device of the vehicle 10 related to the disengagement control of the clutch K0, start control of the engine 14, and the like, for example. The electronic control unit 100 is configured by including a so-called microcomputer having a CPU, a RAM, a ROM, an input/output interface, and the like, for example. The CPU processes a signal in accordance with a program that is stored in the ROM in advance while using a temporary storage function of the RAM, so as to execute various controls of the vehicle 10. For example, the electronic control unit 100 executes output control of the engine 14, drive control of the motor MG including regeneration control of the motor MG, the gear change control of the automatic transmission 20, control of the K0 torque, and the like, and is configured to be sectioned for the engine control, the motor control, the hydraulic control, and the like if necessary. The electronic control unit 100 is supplied with various signals (for example, an engine speed Ne, a turbine rotating speed Nt, that is, the transmission input shaft rotating speed Nin, the transmission output shaft rotating speed Nout corresponding to the vehicle speed V, a pump rotating speed Np, that is, a motor rotating speed (MG rotating speed) Nm, the accelerator pedal operation amount θacc that corresponds to a requested driving amount of the vehicle 10 by a driver, a charging state (charge capacity) SOC of the electric power storage device 44, and the like) that are based on detected values of various sensors (for example, a crank position sensor 90, a turbine rotating speed sensor 92, an output shaft rotating speed sensor 94, a motor rotating speed sensor 96, an accelerator pedal operation amount sensor 98, a battery sensor 99, and the like). The electronic control unit 100 outputs, for example: an engine output control command signal Se for the output control of the engine 14; a motor control command signal Sm for controlling the operation of the motor MG; a hydraulic control command signal Sp for operating the solenoid valves 68, 78, and the like that are included in the hydraulic control circuit 40 in order to control the clutch K0, the hydraulic actuator and the clutch LU of the automatic transmission 20, and the like; a starter command signal Ss for drive control of the starter 46 that rotationally drives the engine 14 when the engine is started; and the like to engine control devices such as a fuel injector, an ignition device, and a throttle actuator, the inverter 42, the hydraulic control circuit 40, the starter 46, and the like, respectively.

Figure 3:
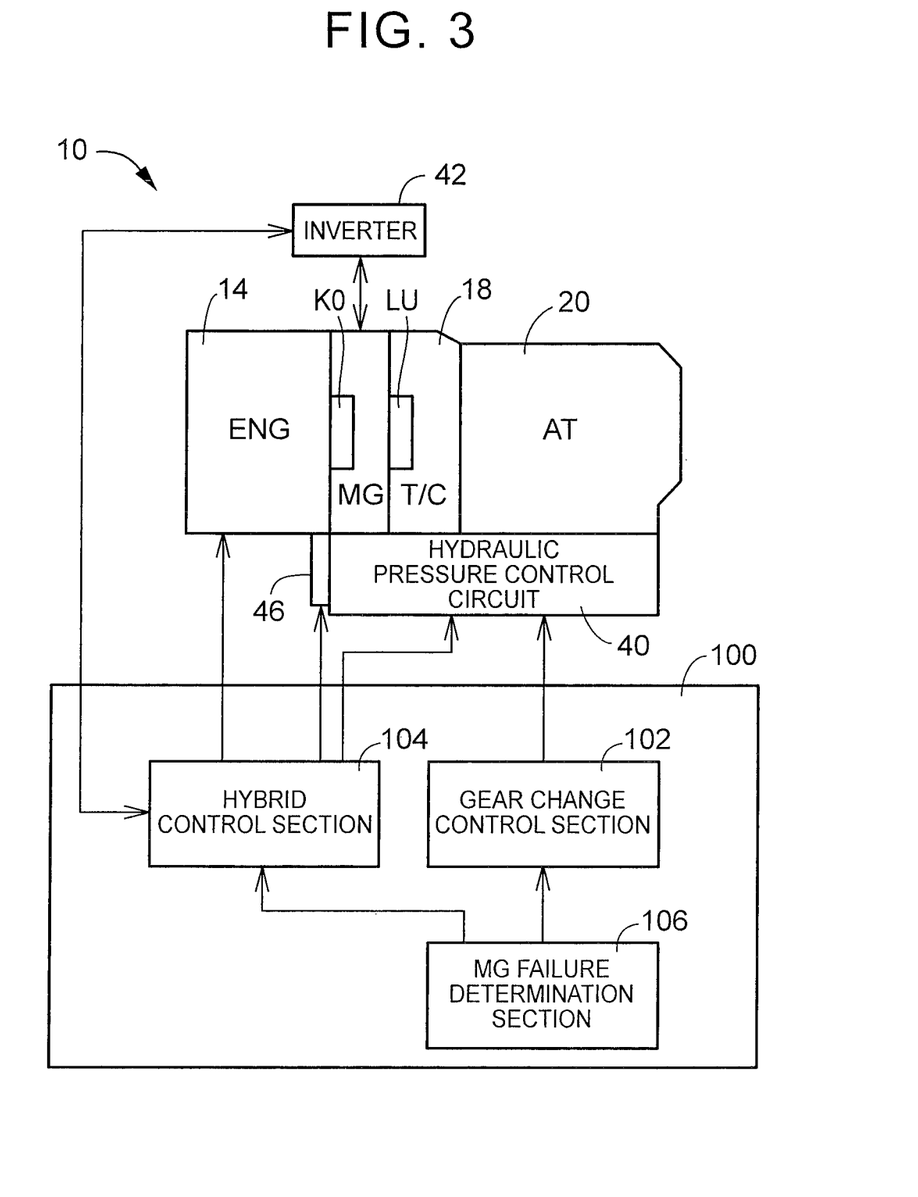
FIG. 3 is a functional block diagram for illustrating main sections of a control function by an electronic control unit.

FIG. 3 is a functional block diagram for illustrating main sections of a control function by the electronic control unit 100. In FIG. 3, the electronic control unit 100 includes gear change control means, that is, a gear change control section 102, and hybrid control means, that is, a hybrid control section 104.

From a known relationship (a gear change chart or a gear change map; not shown) that is computed experimentally or in terms of design in advance and stored (that is, predetermined) with the vehicle speed V and the requested driving amount (for example, the accelerator pedal operation amount θacc or the like) as variables, for example, the gear change control section 102 determines the gear ratio γ of the automatic transmission 20 to be established on the basis of a vehicle state (for example, the actual vehicle speed V, the accelerator pedal operation amount θacc, and the like), and outputs a gear change command value for establishing the determined gear ratio γ to the hydraulic control circuit 40, thereby executing automatic gear change control of the automatic transmission 20. The gear change command value is one of hydraulic control command signals Sp.

The hybrid control section 104 has a function as an engine drive control section for controlling the drive of the engine 14 and a function as a motor operation control section for controlling the operations of the motor MG as the drive power source or as the generator via the inverter 42, and carries out these control functions to execute hybrid drive control by the engine 14 and the motor MG, and the like. For example, based on the accelerator pedal operation amount θacc and the vehicle speed V, the hybrid control section 104 calculates requested drive power Fdtgt that is the requested driving amount of the vehicle 10 by the driver. Then, in consideration of transmission loss, an auxiliary machine load, the gear ratio γ of the automatic transmission 20, the charge capacity SOC of the electric power storage device 44, and the like, the hybrid control section 104 outputs the command signals (the engine output control command signal Se and the motor control command signal Sm) for controlling the drive power sources for traveling such that the requested drive power Fdtgt can be obtained from the output of the drive power sources for traveling (the engine 14 and the motor MG). In addition to the requested drive power Fdtgt [N] in the drive wheel 34, requested driving torque [Nm] in the drive wheel 34, requested driving power [W] in the drive wheel 34, requested transmission output torque in the transmission output shaft 22, or the like can be used as the requested driving amount. In addition, as the requested driving amount, the accelerator pedal operation amount θacc [%], a throttle valve opening amount [%], an intake air amount [g/sec], or the like can simply be used.

More specifically, when only the output of the motor MG is sufficient to provide the requested drive power Fdtgt, for example, the hybrid control section 104 sets a travel mode to a motor travel mode (EV travel mode) and executes a motor travel (EV travel) in which the clutch K0 is disengaged and the vehicle travels only by the motor MG as the drive power source for traveling. On the other hand, when the output of the engine 14 is at least necessary to generate the requested drive power Fdtgt, for example, the hybrid control section 104 sets the travel mode to an engine travel mode, that is, a hybrid travel mode (HV travel mode) and executes an engine travel, that is, a hybrid travel (HV travel) in which the clutch K0 is engaged and the vehicle travels at least by the engine 14 as the drive power source for traveling. Meanwhile, even when the output of the motor MG is sufficient for the requested drive power Fdtgt, for example, the hybrid control section 104 executes the HV travel due to necessity to warm the engine 14 or a device related to the engine 14 and the like. Just as described, based on the requested drive power Fdtgt and the like, the hybrid control section 104 switches between the EV travel and the HV travel by automatically stopping the engine 14 in the engine travel mode and by restarting the engine 14 after the engine is stopped.

The hybrid control section 104 executes a series of operations related to the starting of the engine 14 if it is determined that an engine start request has been made due to an increase in requested driving torque Tdtgt or necessity of warming in the EV travel mode, for example. More specifically, if it is determined that the engine start request has been made, for example, the hybrid control section 104 rotationally drives (cranks) the engine 14 by using the starter 46 while keeping the clutch K0 to be disengaged, and outputs the starter command signal Ss for initiating the starting of the engine 14 to the starter 46. In addition, in conjunction with the cranking of the engine 14 by the starter 46, the hybrid control section 104 executes opening/closing control of an electronic throttle valve, fuel supply control, and ignition timing control, and outputs an engine start command for starting the engine 14 to the engine control devices such as the fuel injector, the ignition device, and the throttle actuator. The engine start command is one of the engine output control command signals Se. In addition, the hybrid control section 104 determines whether the starting of the engine 14 is completed on the basis of whether the engine speed Ne is increased to a specified speed or higher that is predetermined to make determination on perfect ignition of the engine 14 (that is, that the engine 14 can be operated autonomously), for example. Then, if it is determined that the starting of the engine 14 is completed, the hybrid control section 104 outputs a clutch K0 engaging command for engaging the clutch K0 that is a command for controlling the clutch K0, and controls the currently disengaged clutch K0 for engagement.

Here, if the motor MG fails in the EV travel mode in which the clutch K0 is disengaged, the oil pump 36 cannot be driven by the motor MG. Thus, in a case where the motor MG fails, it is preferred that the clutch K0 is engaged and that the oil pump 36 is driven by the engine 14. In order to achieve this, the electronic control unit 100 includes MG failure determination means, that is, an MG failure determination section 106. The MG failure determination section 106 determines whether the motor MG has failed on the basis of whether disagreement in the MG rotating speed Nm or MG torque Tm with the motor control command signal Sm, failure of a device that is related to the drive of the motor MG, or the like occurs, for example. If it is determined by the MG failure determination section 106 that the motor MG has failed in the EV travel mode, the hybrid control section. 104 determines that the engine start request has been made, and executes the above-mentioned series of the operations related to the starting of the engine 14.

If the motor MG fails in the EV travel mode in which the clutch K0 is disengaged, the discharge amount of the oil pump 36 is reduced along with the reduction in the MG rotating speed Nm (that is, the pump rotating speed Np). Consequently, an amount of the hydraulic oil that is required for both of the operations related to the transmission (the automatic transmission 20 and the torque converter 18 with the clutch LU) and the operations related to the clutch K0 cannot be obtained. In other words, an actual discharge amount of the oil pump 36 (an actual discharge amount) is insufficient when compared to the discharge amount of the oil pump 36 that is required to supply an amount of the hydraulic oil required for both of the above operations (a required discharge amount). Accordingly, if the clutch K0 engaging command is output in the series of the operations related to the starting of the engine 14 while the motor MG fails, the hydraulic pressure for the engagement of the clutch K0 is insufficient, and thus the clutch K0 cannot be engaged. This prevents the series of the operations related to the starting of the engine 14 from being completed. Thus, even when the engine 14 is brought into a state capable of autonomous driving, the oil pump 36 cannot be driven by the engine 14.

In view of such a problem, it is considered that, if the required discharge amount of the oil pump 36 is reduced to be smaller than the actual discharge amount, the amount of the hydraulic oil that is required to engage the clutch K0 can be secured. Thus, in this example, an amount of the hydraulic oil that is required for the operations related to the transmission (the automatic transmission 20 and the torque converter 18 with the clutch LU) is reduced, so as to reduce the required discharge amount of the oil pump 36.

Based on the above, if the motor MG fails in the EV travel mode in which the clutch K0 is disengaged, the electronic control unit 100 controls the operations related to the transmission (the automatic transmission 20 and the torque converter 18 with the clutch LU), so as to reduce an amount of the hydraulic oil that is leaked due to the operations related to the transmission (hereinafter referred to as a transmission leaked amount). This reduces the required discharge amount of the oil pump 36. The reduction in the required discharge amount of the oil pump 36 indicates not only that the transmission leaked amount is reduced but also that the amount of the hydraulic oil required for the engagement of the clutch K0 is appropriately secured. In other words, the electronic control unit 100 controls the operations related to the transmission, so as to reduce the transmission leaked amount and increase the amount of the hydraulic oil that is supplied to the clutch K0.

The transmission leaked amount corresponds to an amount of the hydraulic oil that is consumed by the above-mentioned operations related to the transmission (that is, by the operation of the AT/LU hydraulic control system 64), for example, and, more specifically, corresponds to an amount of the hydraulic oil that is refluxed to the oil pan 52 via each of the drain oil passages 80, 82, 84 by the operation of the AT/LU hydraulic control system 64. In addition, to control the operations related to the transmission means to control an amount of the hydraulic oil that is discharged in conjunction with the operation of the solenoid valve 68 and an amount of the hydraulic oil that flows through the lubrication oil passage 74 or the cooling oil passage 76, for example. An aspect of reducing the transmission leaked amount will be described below.

It is considered that the transmission leaked amount can be reduced if an amount of the lubrication oil and an amount of the cooling oil are reduced by reducing the amount of the hydraulic oil that flows through the lubrication oil passage 74 and the cooling oil passage 76. For example, it is considered that the transmission leaked amount can be reduced if the amount of the hydraulic oil that is supplied to the lubrication oil passage 74 and the cooling oil passage 76 is reduced, or if the amount of the hydraulic oil that is discharged from each of the drain oil passages 82, 84 is reduced. It is also considered that the transmission leaked amount can be reduced to a greater extent when the gear ratio γ is maintained in the automatic transmission 20 in comparison with a transition period of the gear change. Furthermore, it is considered that the transmission leaked amount may vary in accordance with the difference in the gear ratio γ that is maintained in the automatic transmission 20. In such a case, the transmission leaked amount may be reduced if the gear is changed and the gear ratio γ is switched to one at which the transmission leaked amount is low, instead of maintaining the current gear ratio γ of the automatic transmission 20. Moreover, it is considered that the transmission leaked amount may vary in accordance with the difference in states of the clutch LU (lockup-on, slip, lockup-off). Accordingly, if an operating state of the solenoid valves 68 varies, the transmission leaked amount also varies. Thus, it is considered that the transmission leaked amount can be reduced by switching the operation of the solenoid valve 68.

More specifically, if it is determined by the MG failure determination section 106 that the motor MG fails in the EV travel mode, the gear change control section 102 controls the solenoid valve 68 to reduce the transmission leaked amount, concurrently with the series of the operations related to the starting of the engine 14 that is executed by the hybrid control section 104. Preferably, the gear change control section 102 outputs a transmission leaked amount reducing command for controlling the solenoid valve 68 to the hydraulic control circuit 40 in order to minimize the transmission leaked amount. The transmission leaked amount reducing command is one of the hydraulic control command signals Sp, and leads to a predetermined operation pattern that is the operation of the solenoid valve 68 by which the transmission leaked amount is minimized in a current state of the vehicle, for example.

Figure 4:
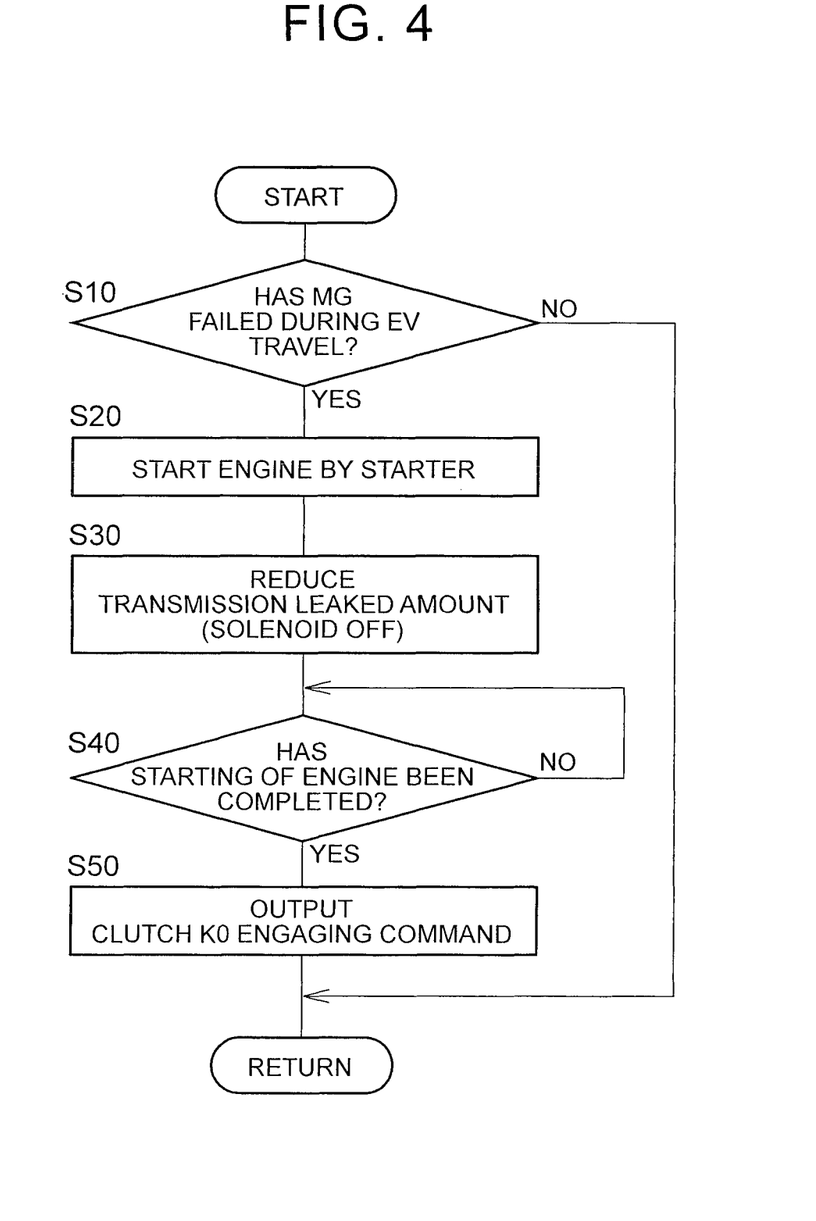
FIG. 4 is a flowchart for illustrating main sections of a control operation of the electronic control unit, that is, the control operation to secure an amount of hydraulic oil that is supplied to a clutch for connecting/disconnecting an engine when a motor fails during disengagement of the clutch for connecting/disconnecting an engine.
Figure 5:
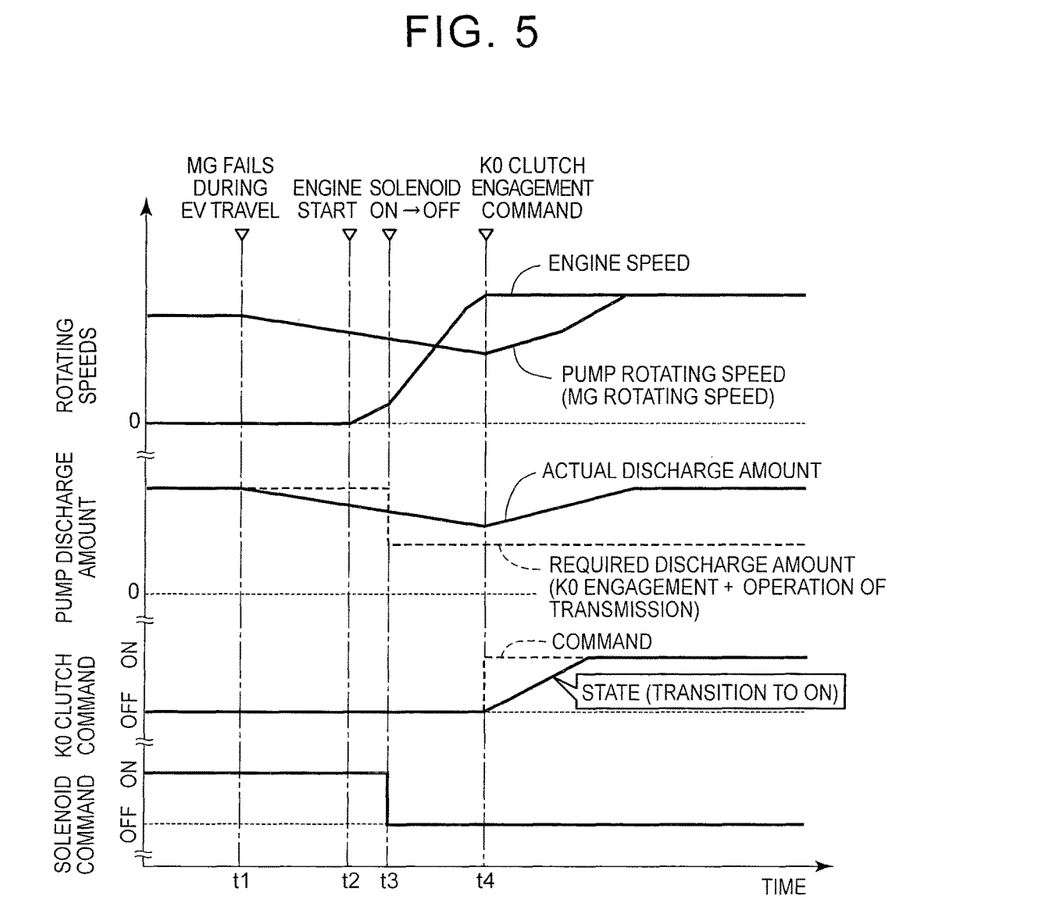
FIG. 5 is an example of a timing chart when the control operation shown in the flowchart of FIG. 4 is executed.
Figure 6:
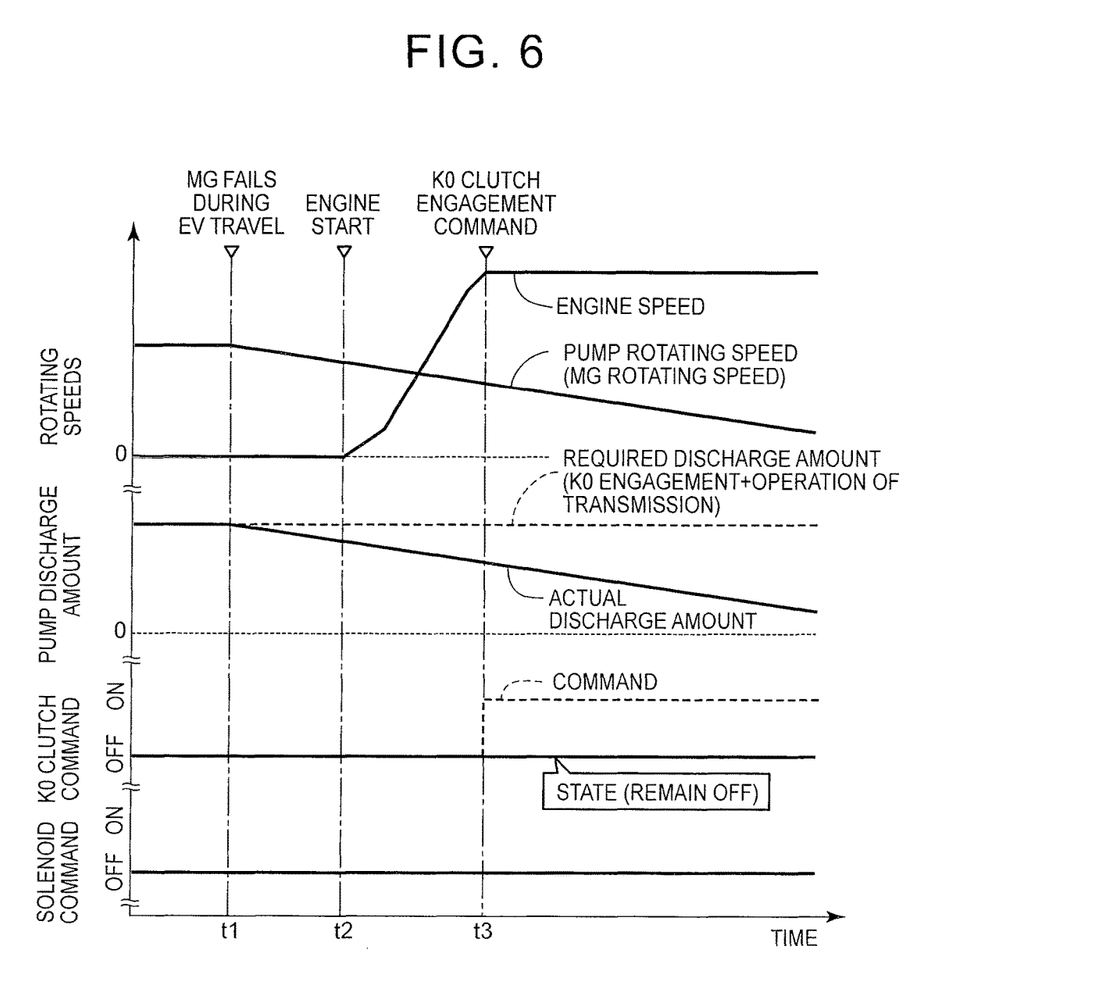
FIG. 6 is an example of the timing chart in a comparative example when the control operation shown in the flowchart of FIG. 4 is not executed.

FIG. 4 is a flowchart for illustrating main sections of a control operation of the electronic control unit 100, that is, the control operation to secure the amount of the hydraulic oil that is supplied to the clutch K0 when the motor MG fails while the clutch K0 is disengaged, and the operation is repeatedly executed in an extremely short cycle time of several msec to several tens of msec, for example. FIG. 5 is an example of a timing chart when the control operation shown in the flowchart of FIG. 4 is executed. FIG. 6 is an example of the timing chart in a comparative example when the control operation shown in the flowchart of FIG. 4 is not executed.

In FIG. 4, it is first determined in a step (hereinafter, the step is omitted) S10 that corresponds to the MG failure determination section 106 whether the motor MG has failed in the EV travel mode, for example (at a time before a time t1 in FIG. 5). If the determination in S10 is negative, this routine is terminated. On the other hand, if the determination is positive (at the time t1 in FIG. 5), the engine 14 is cranked by the starter 46, for example, in S20 that corresponds to the hybrid control section 104. In conjunction with the cranking, the opening/closing control of the electronic throttle valve, the fuel supply control, and the ignition timing control are executed, so as to execute the start control of the engine 14 (from a time t2 to a time t4 in FIG. 5). Then, in S30 that corresponds to the gear change control section 102, the solenoid valve 68 is controlled to reduce the transmission leaked amount, for example. For example, as the predetermined operation pattern, an operation command for one solenoid valve of the plural solenoid valves 68 is switched from ON to OFF (at a time t3 in FIG. 5). Next, it is determined in S40 that corresponds to the hybrid control section 104 whether the starting of the engine 14 (that is, the series of the operations related to the starting of the engine 14) has been completed, for example (from the time t2 to the time t4 in FIG. 5). If the determination in S40 is negative, S40 is repeatedly executed. On the other hand, if the determination is positive, the clutch K0 engaging command for engaging the clutch K0 is output, and the disengaged clutch K0 is controlled for the engagement, for example, in S50 that corresponds to the hybrid control section 104 (at the time t4 onward in FIG. 5).

In FIG. 5, if the motor MG fails in the EV travel mode at the time t1, the engine 14 is started by the starter 46 at the time t2. Concurrently with the start control of the engine 14, the solenoid valve 68 is switched to OFF at the time t3, and the transmission leaked amount is reduced. Accordingly, as shown by a broken line of a pump discharge amount, the required discharge amount is reduced. Then, if the clutch K0 engaging command is output at the time t4 at which the series of the operations related to the starting of the engine 14 is completed, the clutch K0 is appropriately engaged since the hydraulic pressure for engaging the clutch K0 is never insufficient. Accordingly, it is possible to continuously drive the oil pump 36 by the power of the engine 14.

Meanwhile, in FIG. 6, if the motor MG fails in the EV travel mode at the time t1, the engine 14 is started by the starter 46 at the time t2. Then, the clutch K0 engaging command is output at the time t3 at which the series of the operations related to the starting of the engine 14 is completed. However, since the hydraulic pressure for engaging the clutch K0 is insufficient, the clutch K0 is not engaged. Thus, although the engine 14 is operated, the oil pump 36 is not driven by the power of the engine 14, and the pump rotating speed Np keeps being reduced.

As described above, according to this example, even when the motor MG fails in the EV travel mode in which the clutch K0 is disengaged, it is possible by reducing the transmission leaked amount to secure the amount of the hydraulic oil that is supplied to the clutch K0. Accordingly, the clutch K0 can be engaged, and the oil pump 36 can be driven by the power of the engine 14. Thus, even when the motor MG fails in the EV travel mode, an evacuation travel by the engine 14 is allowed.

In addition, according to this example, the solenoid valve 68 is controlled to minimize the transmission leaked amount. Accordingly, even when the motor MG fails in the EV travel mode in which the clutch K0 is disengaged, the transmission leaked amount is minimized, and thus the amount of the hydraulic oil that is supplied to the clutch K0 is further reliably secured.

Furthermore, according to this example, the operations related to the transmission (the automatic transmission 20 and the torque converter 18 with the clutch LU) are controlled so as to reduce the transmission leaked amount and increase the amount of the hydraulic oil that is supplied to the clutch K0. Accordingly, even when the motor MG fails in the EV travel mode in which the clutch K0 is disengaged, not only the transmission leaked amount is simply reduced, but also the amount of the hydraulic oil that is supplied to the clutch K0 is appropriately secured.

Next, another example of the present invention will be described. In the following description, components that are common in both of the examples are denoted by the same reference numerals, and the description thereof will not be repeated.

In the first example described above, even when the motor MG fails in the EV travel mode in which the clutch K0 is disengaged, the amount of the hydraulic oil that is supplied to the clutch K0 is secured by reducing the transmission leaked amount. However, in a case where the motor MG fails during stop of the vehicle or in the EV travel mode, in which the vehicle travels at a low speed, in a state that the clutch K0 is disengaged, even if the transmission leaked amount is reduced, the amount of the hydraulic oil that is supplied to the clutch K0 cannot be secured or may not possibly be secured. It is because and where the discharge amount of the oil pump 36 is originally zero or small.

Figure 7:
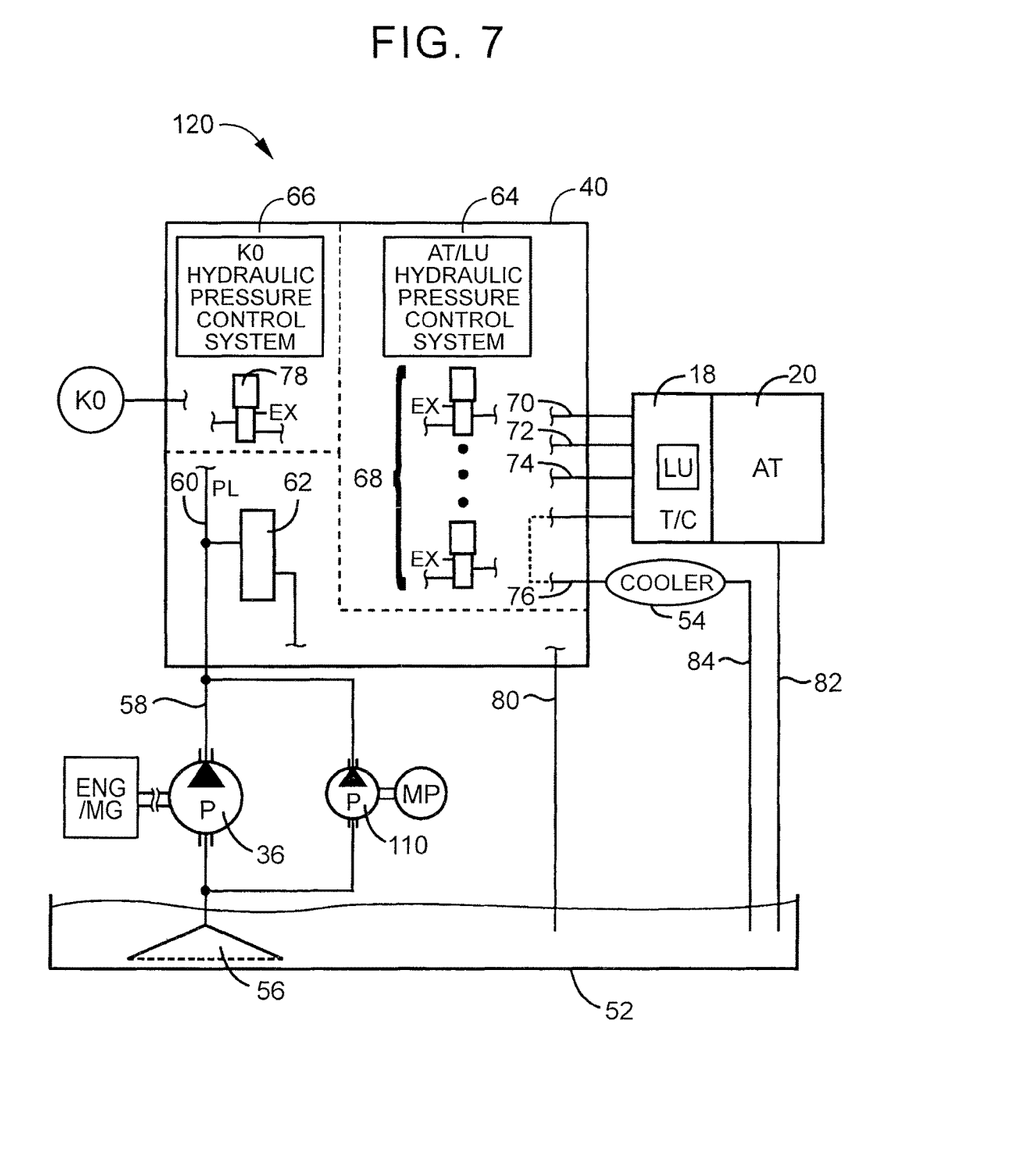
FIG. 7 is a view for illustrating an example of an electric oil pump that is included in the vehicle.

In view of the above, in a second example, in order to secure the amount of the hydraulic oil that is supplied to the clutch K0 even when the motor MG fails regardless of whether the vehicle is in the EV travel mode, the vehicle 10 further includes an electric oil pump 110 that is driven in conjunction with rotation of a motor MP for an oil pump, thereby supplying the hydraulic oil to the clutch K0 and the transmission (the automatic transmission 20 and the torque converter 18 with the clutch LU), the rotation of the motor MP being independent of the rotation of the rotary member located between the clutch K0 and the drive wheel 34 and the motor MP being different from the motor MG as shown in FIG. 7.

The vehicle 10 of this example includes a hydraulic system 120 instead of the hydraulic system 50 of the above-mentioned first example. In FIG. 7, the hydraulic system 120 mainly differs from the hydraulic system 50 in a point of further including the electric oil pump 110. The electric oil pump 110 is arranged in parallel with the oil pump 36, is rotationally driven by the motor MP for an oil pump, and thus can generate the source pressure of the hydraulic oil that is supplied to the hydraulic control circuit 40 regardless of rotational states of the engine 14 and the motor MG (for example, when the engine 14 and the motor MG do not rotate). Similar to the oil pump 36, the electric oil pump 110 suctions the hydraulic oil that is refluxed to the oil pan 52 from the suction port (strainer) 56 and discharges the hydraulic oil to the discharge oil passage 58.

More specifically, if it is determined by the MG failure determination section 106 that the motor MG has failed, similar to the above-mentioned first example, the hybrid control section 104 determines that the engine start request has been made and executes the above-mentioned series of the operations related to the starting of the engine 14. In addition, in the case where the motor MG fails, the hybrid control section 104 increases the amount of the hydraulic oil that is supplied to the clutch K0 by the electric oil pump 110. More specifically, if it is determined by the MG failure determination section 106 that the motor MG has failed, the hybrid control section 104 rotationally drives the electric oil pump 110, outputs an electric oil pump output control command signal for outputting the hydraulic pressure to the motor MP for an oil pump, and supplies the hydraulic pressure to the hydraulic control circuit 40.

If it is determined by the MG failure determination section 106 that the motor MG has failed, similar to the above-mentioned first example, the gear change control section 102 controls the solenoid valve 68 to reduce the transmission leaked amount, concurrently with the series of the operations related to the starting of the engine 14 by the hybrid control section 104.

Figure 8:
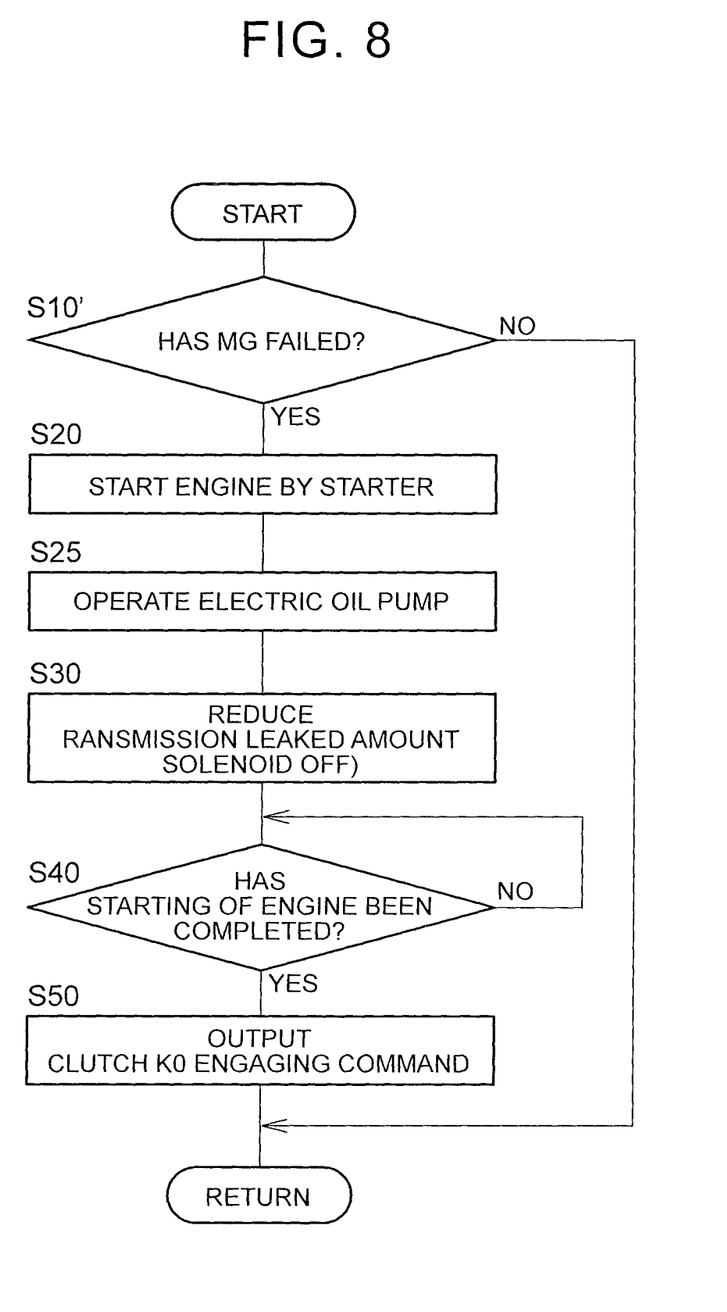
FIG. 8 is a flowchart for illustrating the main sections of the control operation of the electronic control unit, that is, the control operation to secure the amount of the hydraulic oil that is supplied to the clutch for connecting/disconnecting the engine when the motor fails during the disengagement of the clutch for connecting/disconnecting the engine, and shows another example that corresponds to FIG. 4.

FIG. 8 is a flowchart for illustrating the main sections of the control operation of the electronic control unit 100, that is, the control operation to secure the amount of the hydraulic oil that is supplied to the clutch K0 when the motor MG fails while the clutch K0 is disengaged, and the operation is repeatedly executed in the extremely short cycle time of several msec to several tens of msec, for example. FIG. 8 shows another example that corresponds to the control operation illustrated in the flowchart of FIG. 4 in the above-mentioned first example. The following description will mainly be made on differences of FIG. 8 from FIG. 4.

In FIG. 8, it is first determined in S10' that corresponds to the MG failure determination section 106 whether the motor MG has failed, for example. If the determination in S10' is negative, this routine is terminated. On the other hand, if the determination is positive, S20 is executed. Next, in S25 that corresponds to the hybrid control section 104, for example, the electric oil pump 110 is rotationally driven, and an electric oil pump output control command signal Sop for outputting the hydraulic pressure is output to the motor MP for an oil pump. Then, processes in S30 to S50 are executed.

As described above, according to this example, the vehicle 10 further includes the electric oil pump 110. Accordingly, in addition to a fact that the same effects as those in the first example can be obtained, it is possible by driving the electric oil pump 110 to secure the amount of the hydraulic oil that is supplied to the clutch K0 in the case where the motor MG fails during stop of the vehicle or in the EV travel mode, in which the vehicle travels at a low speed, while the clutch K0 is disengaged. Thus, the clutch K0 can be engaged, and the oil pump 36 can be driven by the power of the engine 14.

In addition, according to this example, in the case where the motor MG fails, the operations related to the transmission (the automatic transmission 20 and the torque converter 18 with the clutch LU) are controlled to reduce the transmission leaked amount, and the amount of the hydraulic oil that is supplied to the clutch K0 by the electric oil pump 110 is increased. Accordingly, even when the motor MG fails during stop of the vehicle or in the EV travel mode, in which the vehicle travels at a low speed, while the clutch K0 is disengaged, the amount of the hydraulic oil that is supplied to the clutch K0 is appropriately secured.

This example involves the aspect in which the amount of the hydraulic oil that is supplied to the clutch K0 by the electric oil pump 110 is secured in the state that the transmission leaked amount is reduced. Accordingly, compared to a case where the transmission leaked amount is not reduced, a capacity of the electric oil pump 110 for the engagement of the clutch K0 is reduced. Thus, a small electric oil pump that is provided in a case where automatic stop restart control of the engine 14 (economical running control or idling stop control) is executed when the vehicle 10 is temporarily stopped at an intersection or the like (or when the vehicle travels at a low speed while decelerating), for example, and that generates the hydraulic pressure for the transmission (the automatic transmission 20 and the torque converter 18 with the clutch LU) during the economical running control can be adopted as the electric oil pump that generates the hydraulic pressure for the clutch K0 when the motor MG fails.

The detailed description of the second example of the present invention has been made so far on the basis of the drawings, and the present invention can also be applied to other aspects.

For example, each of the above-mentioned examples is carried out independently. However, each of the above examples does not have to be carried out independently and may be carried out by being combined appropriately.

In addition, the solenoid valve 68 is controlled to reduce the transmission leaked amount in the above-mentioned examples. However, the present invention is not limited thereto. For example, an aspect may be adopted in which a valve having a spool valve piece that mechanically moves in conjunction with fluctuations of the hydraulic pressure may be included and in which the transmission leaked amount is reduced by a switching operation of the valve.

Furthermore, the engine 14 is started by the starter 46 that is provided separately from the motor MG in the above-mentioned examples. However, the present invention is not limited thereto. For example, the engine 14 may be started by ignition start. In an engine start method by the ignition start, the fuel is injected to a cylinder in an expansion stroke of the engine 14 whose rotation is stopped and ignited to combust air-fuel mixture in the cylinder, and then a piston is pushed down by thus-generated explosion torque to rotate a crankshaft, for example. Accordingly, the engine 14 is started. If the engine 14 can be started only by the ignition start, there is no need for the vehicle 10 to include the starter 46. In addition, the ignition start may be assisted, and the engine 14 may be started by the starter 46. Furthermore, an aspect can be adopted in which, when the motor MG does not fail, the disengaged clutch K0 is controlled to be engaged, the engine 14 is thereby cranked by the motor MG, and the fuel supply, the ignition of the engine and the like are started, so as to start the engine 14, for example.

Although the oil pump 36 is connected to the pump impeller 18a in the above-mentioned examples, the present invention is not limited thereto. The oil pump 36 may be a mechanical pump that is connected to any of the rotary members that is located between the clutch K0 and the drive wheel 34 and rotated by the engine 14 and/or the motor MG, and that is driven in conjunction with the rotation of the rotary member, so as to supply the hydraulic oil to the clutch K0 and the transmission (the automatic transmission 20 and the torque converter 18 with the clutch LU).

In the flowchart of FIG. 4 in the above-mentioned example, an execution order of each step can appropriately be changed as long as it does not cause any problem. For example, the step S30 may be executed before the execution of S20, or the step S30 may at least be executed before S50. In addition, in the flowchart of FIG. 8 in the above-mentioned example, an execution order of the each step can appropriately be changed as long as it does not cause any problem. For example, the step S25 may be executed before the execution of S20, the step S30 may be executed before the execution of S25, or the step S25 and the step S30 may at least be executed before S50.

Although the torque converter 18 is used as the fluid-type transmission device in the above-mentioned examples, another fluid-type transmission device such as a fluid coupling device with no torque amplifying effect may be used. In addition, the torque converter 18 may not necessarily be provided.

What has been described so far is merely one embodiment, and the present invention can be executed in an aspect in which various modifications and improvements are made to the embodiment on the basis of knowledge of those skilled in the art.

The invention claimed is:

1. A vehicle comprising:
an engine;
a transmission;
a drive wheel;
a first motor provided in a power transmission path between the engine and the drive wheel, the power transmission path including the transmission;
a clutch configured to disconnect the engine from the first motor by being disengaging;
a mechanical oil pump connected to a rotary member disposed on the power transmission path between the clutch and the drive wheel, the mechanical oil pump configured to be driven by rotation of the rotary member to supply hydraulic oil to the clutch and the transmission; and
an electronic control unit configured to control an operation related to the transmission, so as to reduce an amount of the hydraulic oil that is leaked due to the operation related to the transmission when the first motor fails in a motor travel mode in which the clutch is disengaged and only the first motor is used as a drive power source; and
a hydraulic control circuit configured to control the operation related to the transmission via a solenoid valve,
wherein the electronic control unit is configured to control the solenoid valve so as to minimize the amount of the hydraulic oil that is leaked due to the operation related to the transmission.

2. The vehicle according to claim 1, wherein
the electronic control unit is configured to control the operation related to the transmission so as to reduce the amount of the hydraulic oil that is leaked due to the operation related to the transmission and so as to increase an amount of the hydraulic oil supplied to the clutch.

3. The vehicle according to claim 1, further comprising:
a second motor for an oil pump; and
an electric oil pump driven by rotation of the second motor to supply the hydraulic oil to the clutch and the transmission, the rotation of the second motor being independent of the rotation of the rotary member disposed on the power transmission path between the clutch and the drive wheel.

4. The vehicle according to claim 3, wherein
the electronic control unit is configured to, when the first motor fails, control the operation related to the transmission so as to reduce the amount of the hydraulic oil that is leaked due to the operation related to the transmission and is configured to increase the amount of the hydraulic oil supplied to the clutch by the electric oil pump when the first motor fails.

* * * * *